United States Patent Office 3,248,122
Patented Apr. 26, 1966

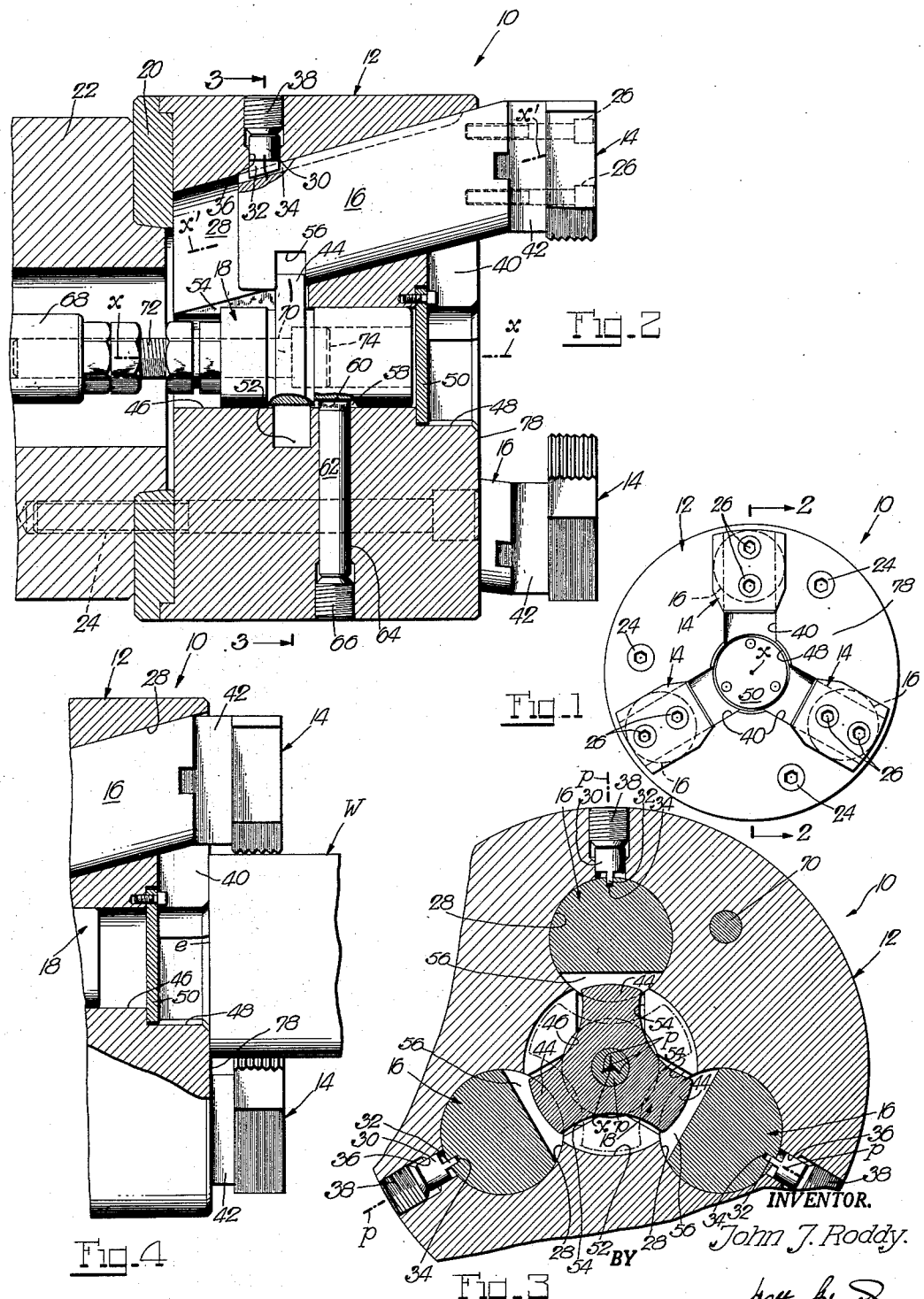

3,248,122
CHUCK OF DRAW-DOWN TYPE
John J. Roddy, Meriden, Conn., assignor to Cushman Industries, Incorporated, Hartford, Conn., a corporation of Connecticut
Filed Aug. 10, 1964, Ser. No. 388,621
5 Claims. (Cl. 279—110)

This invention relates to chucks in general, and to chucks of draw-down type in particular.

Chucks of this type are characterized by work stops on the chuck bodies, and work jaws which are mounted for compound radial and axial movement into and from engagement with work in such wise that on their radial motion into work engagement their simultaneous axial motion will, on work engagement, draw the work firmly against the stops. These chucks are highly advantageous in that they deal effectively with and prevent objectionable separation of the work from a stop or stops therefor due to well-known so-called "bell-mounting" of the jaws on exerting their grip on the work. Among prior chucks of this type are those referred to for identity's sake as "sliding-jaw chucks" in which the jaws, and more particularly their bar-type carriers, are mounted in the chuck body for rectilinear movement in paths inclined to the chuck axis, with the jaw carriers having near their inner ends tranverse grooves which receive peripheral lug formations on an axially reciprocable, bar-type jaw actuator which is connectible with the usual draw bar in a machine tool, such as a lathe, for example, on which the chuck may be mounted. While these sliding-jaw chucks are entirely satisfactory in most respects, they are, however, seriously deficient in one respect, in that their jaws will in many instances not accurately center work on the chuck axis. This is due to the quite limited and one-sided bearing support of the bar-type jaw actuator, with the bearing support being necessarily confined and, hence, limited to the part of the chuck body in front of the lug formations on the actuator owing to the provision in back of the chuck body of a clearance recess sufficiently large and also deep to admit the actuator with its lug formations into position in the chuck body for the only practical assembly of the chuck, as well as to permit operational reciprocation of the actuator. The jaw actuator is thus supported much in cantilever fashion, and is for that reason particularly susceptible to virtually unavoidable forces that tend to cock the same out of axial coincidence with the chuck axis, with the result that the closing jaws shift the work off accurate center, as aforementioned, on any cocked draw of the jaw actuator by the draw bar, with this adverse condition even deteriorating still further and quite rapidly owing to subjection of the one-sided bearing support not only to rapid, but also to the worst possible, wear from the actuator.

It is the primary aim and object of the present invention to provide a sliding-jaw chuck of this type which has all the advantages of the prior sliding-jaw chucks but in contrast to the latter centers work accurately virtually indefinitely, yet involves only a very slight departure from the structure, and no departure from the accustomed assembly, of these prior chucks and also no greater cost than the latter.

It is thus another object of the present invention to provide a sliding-jaw chuck of this type in which the chuck body provides for the jaw actuator a bearing support which is not only incomparably larger, and particularly longer, than in the prior chucks, but also extends on both sides, i.e., in front and rear, of the lug formations on the actuator, with the bearing support extending in the chuck body over any desired, and even its entire, axial extent and, therefore, permitting the formation of the actuator of optimum supported length, and the rear part of the bearing support being recessed to clear the spaced lug formations on the actuator for its assembly with and operational reciprocation in the chuck body.

It is a further object of the present invention to provide a sliding-jaw chuck of this type in which the transverse grooves in the bar-type jaw carriers are conveniently and advantageously machined thereinto, and the chuck body has in its bearing support for the jaw actuator an annular groove in which to receive the lug formations on the actuator and permit their turning into and from register with the transverse grooves in the jaw carriers for their assembly with and disassembly from the latter, whereby for facile assembly of the jaw actuator and jaw carriers with the chuck body and also each other the actuator is simply slid into the chuck body from the rear with its lug formations passing through the aforementioned recesses in the bearing support and into the annular groove therein wherein they are simply turned key-like, first out of alignment with these recesses to admit the jaw carriers with their transverse grooves into the annular groove, and then back into alignment with these recesses into registry and, hence, operational interlock with the grooves in the jaw carriers.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a chuck embodying the present invention;

FIG. 2 is an enlarged section through the chuck taken substantially on the line 2—2 of FIG. 1;

FIG. 3 is a fragmentary section through the chuck taken substantially on the line 3—3 of FIG. 2; and FIG. 4 is a fragmentary section similar to FIG. 2, showing the chuck in work-gripping condition.

Referring to the drawings, the reference numeral 10 designates a chuck having a chuck body 12 with a central axis $x$, a plurality of jaws 14 on bar-type carriers 16, and a bar-type jaw actuator 18. The chuck body 12 carries at its rear an adapter plate 20 with which to locate it on the power spindle 22 of a machine tool, such as a lathe, for example, with the chuck body being releasably mounted on the power spindle 22 by suitable bolts 24.

The jaws 14, which in this instance are three in num- and equi-angularly spaced, are mounted by screws 26 on the carriers 16 which are conveniently formed of cylindrical bar stock and received with a sliding fit in guide recesses 28 in the chuck body 12 which conveniently are cylindrical bores therein with their axes $x'$ being inclined to the body axis $x$ inwardly toward the rear body end (FIG. 2) and lying in planes $p$ which radiate from the body axis $x$ (FIG. 3). The jaw carriers 16 are axially slidable in their guide recesses 28, but are held against rotation therein by being splined to the chuck body 12, with the spline connection being in each instance a stud 30 with a finger projection 32 which is received in a longiutdinal groove 34 in the carrier 16, with the stud 32 being received in a recess 36 in the chuck body and held therein by a threaded plug 38. The carriers 16 are in their guide recesses 28 reciprocable into jaw-open position (FIG. 2) and into jaw-closed position (FIG. 4), and the chuck body 12 is at its front provided in this instance with radial groove formations 40 which provide clearance for the rear shanks 42 of the jaws 14 in the closed position of the latter (FIG. 4).

The jaw actuator 18, which in this instance is a cylindrical bar with outwardly projecting lug formations 44 intermediate its ends, is received with a sliding fit in a bearing support in the form of a central annular recess 46 in the chuck body, with the recess 46 being in this instance a through-bore which at the front of the chuck body is counterbored at 48 for admitting and releasably mounting a disc 50 that closes the front end of the central recess 46 and thus protects the jaw actuator and its bearing support from chips and dirt. The bearing support 46 for the jaw actuator 18 is interrupted intermediate its ends by a machined annular groove 52 (FIG. 2) which traverses and is open to the guide recesses 28 for the jaw carriers 16 (FIG. 3). The chuck body 12 is in its rear provided with further recesses 54 which are in alignment with the respective guide recesses 28 (FIG. 3) and lead lengthwise from the rear end of the chuck body 12 into the annular groove 52 therein (FIG. 2), with these recesses 54 being in this instance over their entire lengthwise extent open to the bearing support 46 and to the respective guide recesses 28. The recesses 54 are preferably break-through slots between the bearing support 46 and the respective guide recesses 28, with these slots being conveniently machined in the chuck body after first forming the described bores for the bearing support and guide recesses therein.

The jaw actuator 18 is axially slidable in the bearing support 46 for its operational reciprocation to cause opening and closing of the jaws 14. To this end, the actuator 18 is operatively connected with the jaw carriers 16 by having its lug formations 44 fittedly received in, and hence in interlock with, machined transverse grooves 56 in the respective jaw carriers (FIGS. 2 and 3), with these lug formations 44 passing back and forth with clearance in the respective recesses 54 and in the continuing annular groove 52 on operational reciprocation of the actuator 18.

The annular groove 52 intermediate the bearing support 46 in the chuck body is for assembly and disassembly of the chuck, and in particular for assembly and disassembly of the jaw actuator 18, jaw carriers 16 and chuck body 12. Thus, in assembling these parts, the jaw actuator 18 is slid into its bearing support 46 from the rear of the chuck body, with the lug formations 44 passing through the recesses 54 and into the annular groove 52, whereupon the actuator 18 is turned to bring its lug formations 44 in the groove 52 out of alignment with the guide recesses 28 as shown in dot-and-dash lines in FIG. 3, in order to permit sliding of the jaw carriers 16 in their guide recesses 28 into axial position therein in which their transverse grooves 56 register with the annular groove 52 (FIG. 2), with the actuator 18 then being turned key-like to bring its lug formations 44 into interlock with the transverse grooves 56 in the jaw carriers 16 as shown in full lines in FIG. 3. Disassembly of these parts is now self-evident and requires no description. To hold the actuator 18 against turning movement in operation, i.e. with its lug formations 44 in interlock with the transverse grooves 56 in the jaw carriers 16 and in line with the recesses 54, the actuator has a releasable spline connection with the chuck body 12, involving in this instance (FIG. 2) a longitudinal groove 58 in the actuator into which projects a finger 60 on a stud 62 in a transverse bore 64 in the chuck body in which it is removably retained by a threaded plug 66.

The jaw actuator 18 also has means for its releasable connection with a draw bar 68 in the hollow power spindle 22 (FIG. 2). Thus, the actuator 18 carries a screw 70 the shank 72 of which extends rearwardly from the actuator and is threadedly received by the draw bar 68, with the screw 70 being applied to the draw bar with a suitable driver at the screw head 74 on temporary removal of the closure disc 50 (FIG. 2). The draw bar 68 is power-reciprocated in conventional manner under an operator's control for operational reciprocation of the jaw actuator in closing and opening the jaws 14.

Assuming now that the jaws 14 of the mounted chuck are in open position (FIG. 2) and that it is desired to mount work W in the chuck, the work is simply placed with one of its end faces, in this instance the end face $e$ (FIG. 4), against the machined front face 78 of the chuck body as an exemplary work stop, whereupon the operator will cause power retraction of the draw bar 68 and connected jaw actuator 18 (FIG. 4) in the course of which the jaw carriers 16 will be drawn inwardly in their guide recesses 28 until the jaws 14 engage the work W and accurately center it with respect to the chuck axis $x$ just when they grip the work uniformly. Such inward draw of the jaw carriers 16 at an inclination to the chuck axis $x$ with resultant compound motion of the jaws 14 radially inwardly and rearwardly parallel to the chuck axis $x$, has several advantages which are characteristic of chucks of this general draw-down type. Thus, this compound motion of the jaws 14 results in their grip of the work with wedge-like firmness. Also, and even more important, the jaws 14 will, on their radial inward motion into uniform engagement with and firm grip on the work, also draw the same with its end face $e$ firmly against the work stop, in this instance the front face 78 of the chuck body, owing to the simultaneous rearward motion of the jaws parallel to the chuck axis $x$. Accordingly, even though well-known bell-mouthing, to a greater or lesser extent, of the jaws 14 is unavoidable when they exert a firm grip on the work, and such bell-mouthing of the jaws has a tendency to separate the work from its end stop on the chuck, this tendency is more than counteracted by the forceful draw of the work against its end stop by the jaws when they exert their grip on the work, wherefore the work will rest on its end stop not only unfailingly but with even greater firmness than it could possibly be held thereon by an operator. The chuck is thus particularly accurate in its performance, for not only is the centering of the work by the jaws accurate within exceedingly close, and to all practical intents and purposes non-existing, tolerances owing to the closure of the jaws on the work by the wedge-like action of their inclined carriers, but the work is, by firm engagement of its end face with the work stop, also referenced to the plane of the latter for its machining in the chuck about a work center which is also accurately normal to this end face, with the work being also held in the chuck with even greater firmness than by the jaws alone owing to the jaw-implementing action in this respect of the work stop on the work. Of course, while in the exemplary chuck shown the machined front face 78 of the chuck body serves as the work stop, it is obviously within the purview of the invention to provide the chuck body at its front with a separate work stop or stops.

Accurate long-time performance of the chuck also depends a great deal on uniform back-and-forth action of the jaw carriers 16 and, hence, on operational reciprocation of the actuator 18 with its axis in fairly close coincidence with the chuck axis $x$, but even more important, in exact parallelism with the chuck axis. This is achieved in the present chuck by the large, and in particular long, bearing support 46 in the chuck body which affords maximum support for the actuator 18 on both sides of its acting lug formations 44 and renders the actuator immune to any forces from the draw bar 68 or from any other parts which would have a cocking tendency on the actuator, whereby the actuator and its bearing support are also virtually free from wear for the longest time. In this connection, the bearing support 46 extends over a predominant part of the axial extent of the chuck body, and the actuator is preferably substantially of maximum length at which it will, in its operational reciprocation, remain entirely within its bearing support and be with its ends near the ends of the latter at the opposite ends of its operational reciprocation range.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a chuck, the combination of a body with front and rear ends and a central axis, said body having a first inner surface defining a central annular recess open at the rear body end, other inner surfaces defining second angularly-spaced annular recesses open at the front body end with their axes being inclined to said central axis inwardly toward the rear body end and extending in planes, respectively, radiating from said central axis, an annular groove in said first surface intermediate its ends traversing said second recesses, and third angularly-spaced recesses in said first surface between and open at the rear body end and said groove and being aligned with and also open to said second recesses; a bar-type jaw actuator having a journal fit, and being reciprocable, in said central recess and having intermediate its ends outwardly projecting lugs spaced the same as said second recesses; and bar-type jaw carriers having a sliding fit, and being reciprocable, in said second recesses, respectively, and having transverse grooves in register with said annular groove in first jaw-open positions of said carriers, said actuator being introduced in said central recess through the rear body end with the lugs thereon passing through said third recesses, with said actuator being in said first carrier positions turnable with its lugs in said annular groove into and from interlock with said carrier grooves, and said carriers being on operational reciprocation of said actuator reciprocated by the latter between said first positions and rearward jaw-closing positions thereof, with said actuator lugs then reciprocating in said third recesses and annular groove while in interlock with said carrier grooves.

2. The combination in a chuck as set forth in claim 1, in which said body has mounting means at its rear end, and said jaw actuator has front and rear ends and means at its rear end for releasable connection with a draw bar.

3. The combination in a chuck as set forth in claim 1, in which said second recesses in said body are throughbores, and said third recesses are machined rectangular slots of smaller width than the diameters of said bores and are open to said central recess and bores over their extent from the rear body end to said annular groove.

4. The combination in a chuck as set forth in claim 1, in which said central recess extends over a predominant part of the axial extent of said body, and said jaw actuator is of a length to remain entirely within said central recess in its operational reciprocation.

5. The combination in a chuck as set forth in claim 1, in which said central recess extends over a predominant part of the axial extent of said body, and said jaw actuator is of a length to remain on operational reciprocation entirely within said central recess and be with its ends near the ends of the latter at the opposite ends of its operational reciprocation.

References Cited by the Examiner

UNITED STATES PATENTS

| | | | |
|---|---|---|---|
| 370,604 | 9/1887 | Cahill | 279—60 |
| 1,034,419 | 8/1912 | Catucci | 279—60 |
| 1,879,656 | 9/1932 | Brown | 279—60 |
| 3,188,102 | 6/1965 | Mott | 279—121 |

ROBERT C. RIORDON, *Primary Examiner.*